United States Patent [19]

Namdari

[11] 4,443,997
[45] Apr. 24, 1984

[54] APPARATUS FOR VACUUM COLLECTION AND COMPACTING OF LEAVES AND GRASS CLIPPINGS

[76] Inventor: Bahram Namdari, P.O. Box 17366, Milwaukee, Wis. 53217

[21] Appl. No.: 354,236

[22] Filed: Mar. 3, 1982

[51] Int. Cl.³ .............................................. A01D 35/22
[52] U.S. Cl. ..................................... 56/13.3; 56/16.6; 56/202; 56/320.2
[58] Field of Search ................... 56/13.3, 13.4, 12.8, 56/16.4, 16.6, 320.2, 255, 341, 202

[56] References Cited

U.S. PATENT DOCUMENTS

| | | | |
|---|---|---|---|
| 2,843,989 | 7/1958 | McClellan | 56/341 |
| 3,242,658 | 3/1966 | Morales | 56/13.4 |
| 3,736,736 | 6/1973 | Myers | 56/16.6 |
| 3,934,394 | 1/1976 | Garrison | 56/344 |
| 4,103,477 | 8/1978 | Mullet et al. | 56/16.6 |
| 4,345,416 | 8/1982 | Cameron | 56/13.3 |

Primary Examiner—Jay N. Eskovitz
Attorney, Agent, or Firm—Andrus, Sceales, Starke & Sawall

[57] ABSTRACT

Apparatus for leaf and grass vacuuming and compaction in a bag, although usable independently is shown mounted on a wheeled carriage of a power lawnmower on which are mounted a push-handle, a gasoline engine, a lawnmower blade drivable by the engine, a vacuum chamber enclosing a fan drivable by the engine, and a receptacle bag above which is mounted a compactor having a reciprocably movable ram. The ram is driven either by a belt-drive from the engine, or by an electric motor energized from the engine generator or starter battery, or by a hydraulic pump/motor system driven by the engine. A pick-up hose is attached to the vacuum chamber inlet and a discharge hose is attached to the vacuum chamber outlet whereby material such as leaves and grass clippings entering the pick-up hose are expelled through the discharge hose into the removable bag. As the material fills the bag, the compactor is actuated to cause the movable ram member to repeatedly descend into the bag to compact the material therein. The compactor also includes a fan or centrifuge for blowing material off the ram and into the bag after the ram returns above the bag opening. The pick-up hose is selectively connectable to the lawnmower to pick up material as the lawn is being mowed or as the carriage is moved or manually while the carriage is stationary and the mower is disengaged.

16 Claims, 14 Drawing Figures

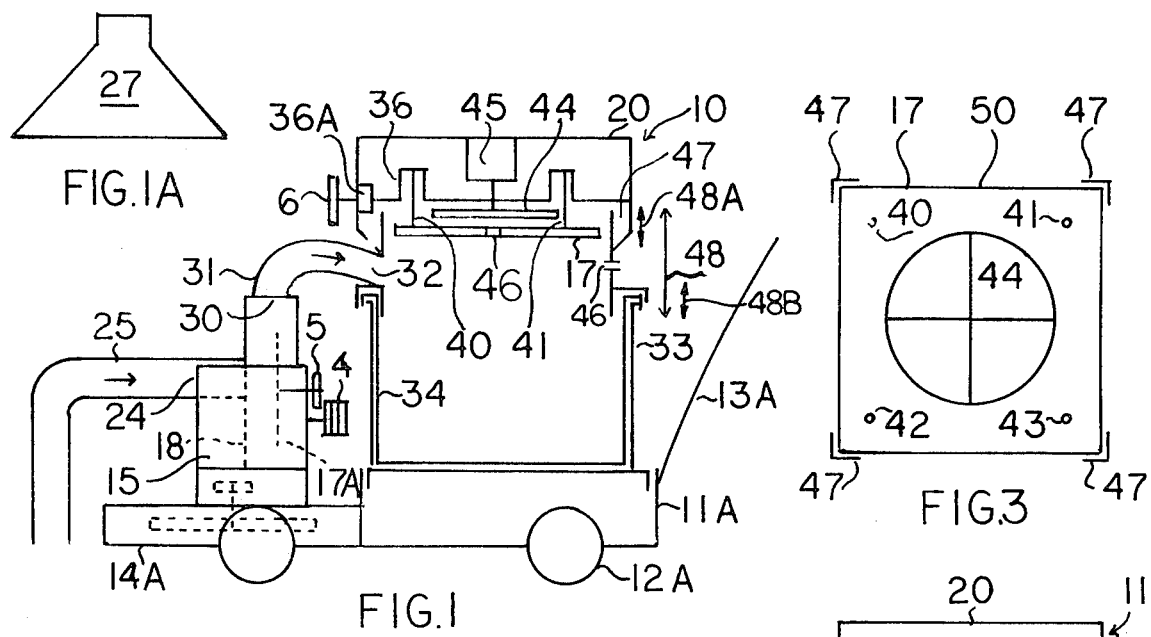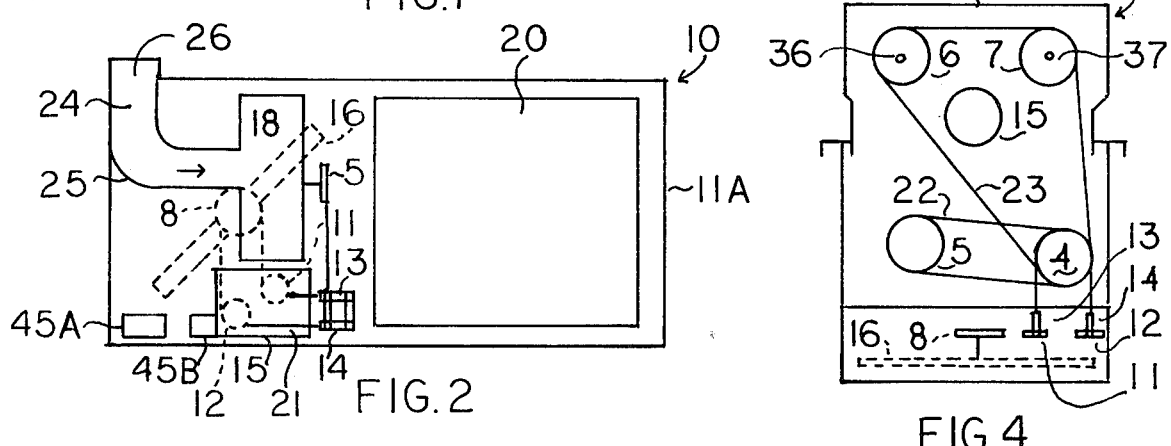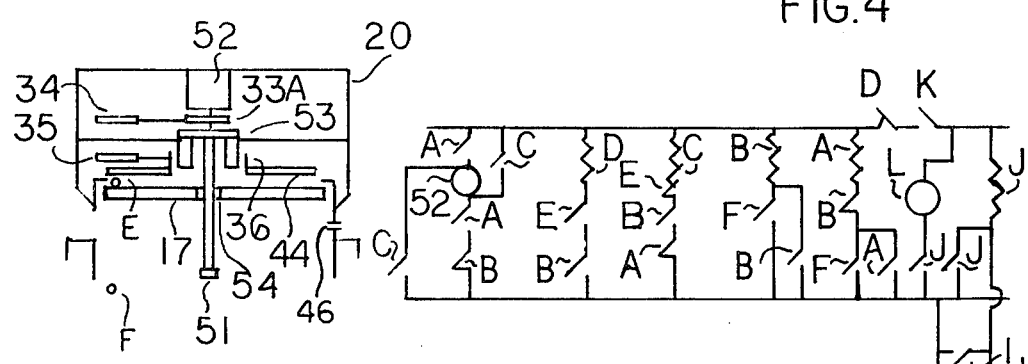

APPARATUS FOR VACUUM COLLECTION AND COMPACTING OF LEAVES AND GRASS CLIPPINGS

BACKGROUND OF THE INVENTION

1. Field of Use

This invention relates generally to apparatus for vacuum collection and compacting of leaves and grass clippings into bags. In particular it relates to such apparatus which can be used independently or which can be combined with a power lawnmower or which can be towed by a vehicle such as a garden tractor.

2. Description of the Prior Art

At present, the grass clippings after being cut by a lawnmower or a mower/tractor wherein small collecting bags which then need to be carried to the corner of the street and emptied, or in the areas where this is not allowed need rebagging in disposable plastic bags. Depending on the size of the lot or yard this is quite a lengthy and time-consuming process, and takes most of the time that is spent by the homeowner, usually on valuable weekends. The same applies to grass-catching trailers that are attached behind mower tractors. Not only are the trailers bulky, but after they have been filled, much time and effort is needed to empty the trailer or bag its contents.

These problems multiply and become enormous in the fall when it is the leaf-collecting time, because leaves are voluminous and, because of their curly and irregular shape, a small amount of them takes up a large space. In communities that require bagging of leaves, not only a lot of time is spent to rake and bag them, but also for the aforementioned reasons of being space-consuming objects, it requires many bags and could account for days and days of work, depending on the size of the lot. In communities that do not require bagging, the leaves often must be piled near the street because the streets cannot be narrowed or obstructed. This creates a few problems including the destruction of the lawn, since it sometimes takes over a week for the city collectors to come and take the leaves and during this period the lawn deteriorates, sometimes badly. And when they collect the leaves, they do not collect them completely and a lot of leaves still remain on the lawn which requires further raking and cleaning. Also, during this period of waiting, particularly during stormy days, the leaves can be blown back onto the raked grass, or onto a neighbor's lot and very often into the street which is against the ideal concept of a clean city. Also, because these leaves are collected at different locations of the lot, this is unsightly.

Various types of machines have been developed to vacuum and bag lawn clippings and leaves. Some such machines are combined with power lawnmowers. Others are simply employed independently to clean up leaves or clippings from previous mowing. The following U.S. patents illustrate the state of the art: U.S. Pat. Nos. 3,984,893; 3,846,963; 3,732,574; 3,664,099; 3,058,284. However, all of the prior art machines of which applicant is aware do not include any means to compact the collected clippings and leaves after collection and, therefore, the problems of unnecessarily frequent bag-emptying and under-utilization of expensive plastic bags still remain.

SUMMARY OF THE PRESENT INVENTION

In accordance with the present invention there is provided improved apparatus for vacuuming and collecting and compacting in a bag leaves and grass clippings. The apparatus is usable independently or it can be mounted on and used in conjunction with hand-guided or tractor-type lawnmowers or can be towed by tractors or the like.

Apparatus in accordance with the invention aims to solve the problems hereinbefore mentioned. In this invention, the grass or leaves are vacuumed and compacted in strong disposable bags, with or without being shredded. The empty bag is easily loaded on the equipment and after it has been filled with grass or leaves, because of compaction, can hold much more than a regular bag of the same size. The filled bag is easily disposed with a minimum of time and effort. The bag is closed, for example, by some means such as pulling a purse string or cord or by other methods. The filled bag may be put near the street for removal. As was mentioned, because the vacuumed grass or leaves are compacted, the homeowner can spend more of his weekend time for pleasure and would not be as tired. Instead of tens of bags, there will be only a few neat bags, and there will be no more leaves destroying the lawn and blowing around.

Apparatus in accordance with the invention generaly comprises: a support, preferably mobile; a prime mower such as an internal combustion engine or electric motor on the support; a vacuum pump on the support drivable by the prime mover, such vacuum pump having an inlet port and an outlet port; a receptacle such as a removable bag on the support having an inlet port connected to the outlet port of the vacuum pump; and a compactor on the support and including a reciprocably movable ram for entering the receptacle and compacting the material therein. The compactor further includes a fan or centrifuge for blowing into the bag such material as leaves and grass, which accumulates on top of the ram during periods when the ram has descended below the receptacle inlet port. The ram is driven either by a belt-drive from the prime mover, or by an electric motor energized from a generator or battery associated with the prime mover, or by a hydraulic pump/motor system driven by the prime mover. The centrifuge is driven by a separate electric motor or by the ram drive or by other suitable means.

The apparatus in accordance with the invention can be added to all grass cutting and leaf collecting equipment that is presently used. Also, it can be connected to a hand rake by an extension hose or to a thatcher. Or, with the use of an extension hose, while the equipment is stationary, the areas that are hard to reach, such as around trees or under the bushes or so on can be vacuumed.

In one embodiment disclosed herein the apparatus is mounted on a support such as the wheeled chassis of a power mower which has a housing in which the mower blade rotates and the housing has a discharge port. The prime mover also drives the mower blade. The inlet port of the vacuum pump is connected to the discharge port of the mower housing by a flexible hose. The hose is detachable from the housing to enable manually directed vacuuming of the lawn. Suitable clutch mechanisms enable the mower, the vacuum and the compactor to be operated independently of each other. Electric controls are provided to effect automatic operation of the compactor. Electric signal means are provided to indicate to the operator when the bag is full and further compaction is not possible.

Apparatus in accordance with the invention offers several advantages over the prior art. For example, when combined with a power lawnmower, the vacuum mechanism can ingest grass clippings immediately after cutting from the lawnmower housing and feed them into the container bag wherein, when the bag is nearly full, the clippings can be compacted to enable the bag to be completely filled. On the other hand if the lawnmower is not being used, the apparatus can still be wheeled across a lawn and the vacuum mechanism will ingest leaves and feed them to the bag wherein they are compacted. If preferred, the unit may be stopped and the hose leading to the lawnmower housing can be detached and fitted with a tool which facilitates manual pick-up of grass and leaves which may be present in a pile for example. The compacting mechanism ensures that grass and leaves are so compressed or compacted within the bag that the maximum carrying capacity of the bag is utilized. This is important because plastic bags are relatively expensive. The invention is adaptable to apparatus which is operated by prime movers in the form of small internal combustion engines or apparatus which is powered by electric motors which are connected by relatively long power cords to an electric power source.

These and other objects and advantages of the present invention will appear hereinafter as this disclosure progresses, reference being had to the accompanying drawings.

THE DRAWINGS

FIG. 1 is a side elevation schematic view, with portions broken away, of a power lawnmower having lawn vacuuming and leaf/grass collecting and compacting apparatus associated therewith;

FIG. 1A is a top plan view of a nozzle for the vacuum mechanism of the apparatus of FIG. 1;

FIG. 2 is a top plan schematic view of the apparatus of FIG. 1;

FIG. 3 is a top plan schematic view of a portion of the collecting and compacting mechanism of the apparatus of FIG. 1;

FIG. 4 is a front elevation schematic view of the collecting and compacting mechanism of the apparatus of FIG. 1;

FIG. 5 is a side elevation schematic view, with portions broken away, of a portion of another embodiment of the compacting mechanism;

FIG. 6 is a circuit diagram of an electric control system for the mechanism shown in FIG. 5;

DESCRIPTON OF PREFERRED EMBODIMENTS

Figure 13:
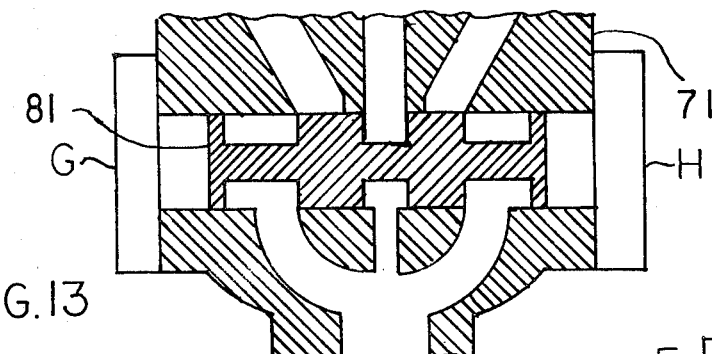
FIG. 13 is an enlarged cross-section view of a hydraulic control valve used in the mechanism of FIG. 7.

Referring to FIGS. 1, 2 and 4, the numeral 10 designates apparatus in the form of a combined lawnmower, a leaf and grass vacuuming mechanism and a compacting mechanism in accordance with the present invention. Apparatus 10 comprises a chassis or support structure 11A having ground-engaging wheels 12A, a push-handle 13A connected to the chassis, and a housing 14A on the chassis for receiving material such as leaves and grass to be ingested by the vacuuming mechanism. Apparatus 10 further comprises a prime mover 15 in the form of an internal combustion gasoline engine, for example, which is mounted on housing 14A, but which could take the form of an electric motor (not shown).

Prime mover 15 is connected to drive a lawnmower blade 16 which is rotatably mounted in housing 14A and connected to a pulley 8. Prime mover 15 is also connected to drive a fan blade 17A which is rotatably mounted in a vacuum chamber 18 of the vacuuming mechanism and connected to a pulley 5. Prime mover 15 is further connected to drive a reciprocably movable compactor ram 17 which is mounted for reciprocable vertical movement in a removable hood 20 of the compactor mechanism and connected to pulleys 6 and 7 by drive rods 36 and 37, respectively. Prime mover 15 comprises a drive pulley 11 which drives a first endless flexible drive belt 21 which is reeved around the driven pulley 8 and around pulleys 12, 13, 14 and 4. Pulley 4 drives a second endless flexible drive belt 22 which is reeved around the driven pulley 5. Pulley 4 also drives a third endless flexible drive belt 23 which is reeved around the driven pulleys 6 and 7. It is to be understood that suitable clutch mechanisms (not shown) are provided to enable the mower, vacuum and compactor to operated simultaneously or to allow each to be operated independently.

As FIGS. 1, 1A and 2 show, the vacuum chamber 18 of the vacuum mechanism includes an inlet or suction port 24 which is connected by a flexible duct 25 to an outlet port 26 on mower housing 14. Duct 25 can be detached from port 26 and provided with the extension or fitting 27 shown in FIG. 1A if manual vacuuming is to be carried out. If preferred, the pick-up end of duct 25 can be mounted in front of the mower so the leaves and debris can be vacuumed and compacted without running the mower blade. Vacuum chamber 18 also includes an outlet or pressure port 30 which is connected by a duct 31 to an inlet port 32 on the compactor mechanism (or the container or bag 34).

As FIGS. 1 and 3 make clear, a receptacle structure 33 is provided for supporting a strong, flexible, removable trash bag 34 therein. The compactor mechanism is mounted on structure 33 and comprises hood 20, the inlet port 32, the pulleys 6 and 7, the drive rods 36 and 37 which are connected to their pulleys through reduction gears 36A and 37A, the ram 17 which is connected to the latter rods by vertical rods 40, 41, 43, 43. The compactor mechanism also comprises a rotatable blade 44 which is driven by an electric motor 45. Motor 45 is energized from a starter battery 45A for the engine or a generator 45B on engine 15. The best way to remove the bag 34 is by lowering base 83, and hereinafter described. When the container and the bag 34 moves downward and is clear of the space designated by arrow 48B, then it can be slid forward on rails (not shown). Since the bag is heavy, it is best that it not be lifted but rather pulled out from a side door (not shown), after the latter is opened. The supports for hood 20 have not been shown to prevent complication of the drawing. Perforations 46 in ram 17 and in the side wall allow air escape as the ram descends.

In operation, as material is fed into the bag 34 and reaches a certain height (i.e. about ¾ of the way full) where compaction is required, ram 17 is set in motion by engagement of a clutch (not shown) for pulleys 6 and 7 and motor 45 is energized by manual operation of a switch (not shown). Pulleys 6 and 7 rotate to cause the drive rods 36 and 37, respectively to rotate. As FIG. 1 shows, reduction gears such as 36A and 37A, respectively, are provided between the pulleys 6 and 7 and the rods 36 and 37, respectively. As the rods 36 and 37 rotate they cause vertical movement of the vertical suspension rods 40, 41, 42 and 43 which are connected to ram 17. Thus, ram 17 moves downwardly past inlet port 32 and into the bag 34 for a short distance, thus compacting the material accumulated in bag 34. While ram 17 is disposed below the inlet port 32, incoming material tends to pile up on the top side of ram 17 but is dispersed by the centrifuge blade 44 driven by electric motor 45 after ram 17 ascends above the bag opening. The material is flung outwardly to the sides of hood 20 and is forced down into bag 34. When bag 34 is full, the operator takes such action as is necessary to gain access to bag 34 (i.e. by removing hood 20 or opening an access door, not shown) and then removes the bag and replaces it with a new one. Ram 17 is guided in its reciprocating movement by four guide rails 47 which are shown in FIGS. 1 and 3 which extend for a distance designated by an arrow 48 in FIG. 1. This distance is also the distance that ram 17 travels while compacting the contents of bag 34. It is unnecessary for the ram to move any further into bag 34 because it is only necessary to compress the material accumulating near the top of the bag. The supporting rails 47 only extend up to arrowed area 48A. Thus space 50 is available for leaves to be blown into bag 34. Below area 48A rails 47 become solid walls, so the ram can push the leaves down and compact them. Preferably, centrifuge blades 44 start their motion when the ram has moved up into area 48A. However, if desired the ram can be designed to travel further downward. As previously explained, the centrifuge or blades 44 expel material accumulating above ram 17 through the spaces 50, shown in FIG. 3 between the guide rails 47 and the ram 17. Space 50 is continued down as is shown by arrow 48A in FIG. 1. These blades can run continuously or can be rotated during their functioning time (i.e., when ram 17 is in the space 48A).

FIGS. 5 and 6 pertain to another embodiment of the invention wherein the ram 17 is reciprocably moved by a power screw 51 which is driven by a motor 52 within hood 20. More specifically, motor 52 is connected through a gear box 53 to power screw 51. Motor 52 is also connected by pulleys 33A, 34, 35 and 36 to drive the centrifuge blades 44. As FIG. 5 shows, ram 17 is provided with a threaded nut 54 which engages the threaded power screw 51. Two limit switches, namely, an upper limit switch 55 and a lower limit switch 56 are provided near the uppermost and lowermost limits of travel of ram 17. When ram 17 reaches these extreme positions, operation of the limit switches 55 and 56 effects reversal of motor 52 and in this manner ram 17 is caused to move up and down to effect compaction. Operation of motor 52 also effects rotation of the blades 44 and it is immaterial that the centrifuge reverses rotation from time to time.

FIG. 6 shows the electrical control circuit for motor 52 and is understood to operate as follows. When manually operated switch K is closed by the machine operator whenever he feels it is time for compacting to occur, the relay coil A energizes because relay switch B is closed and limit switch F is closed because of the position of ram 17 relative to limit switch F. Relay coil A remains energized and its switch remains closed until motor 52 pushes ram 17 down to a position wherein limit switch F is caused to close. At this point relay coil B will be energized and relay contact B will open to de-energize motor 52. When relay coil B is energized, relay coil C also becomes energized and operates its contacts to effect reversal of the direction of rotation of motor 52 and consequently, ram 17 also. When ram 17 reaches upper limit switch E and again effects its closure, relay coil D becomes energized and, because relay contact B is still closed, relay coil D will operate its contacts. This will shut off the entire system when the contact D in series with switch K opens. It is to be understood that relay D is a time-delay relay that will keep ram 17 from operating for whatever length of time is chosen. The time-delay selected would be sufficient to allow an adequate amount of leaves and grass to collect in bag 34 before ram 17 is again moved downward. This will prevent unnecessarily rapid reciprocating movement of ram 17.

Figures 7, 8:
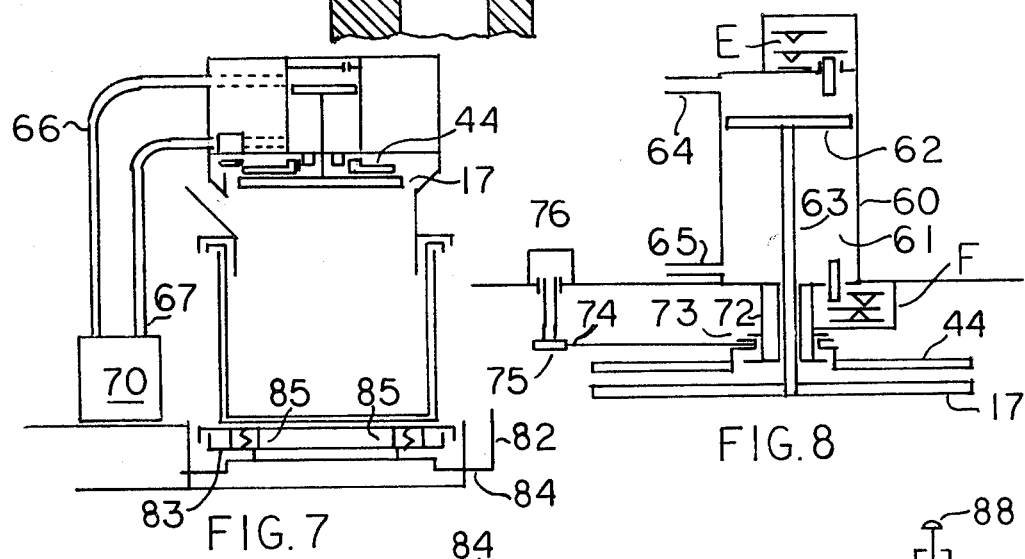
FIG. 7 is a side elevation schematic view, with portions broken away, of a portion of still another embodiment of the compacting mechanism.
FIG. 8 is an enlarged schematic view of portions of the hydraulic control system shown in FIG. 7.

Referring now to FIGS. 7 through 13, there is shown a third embodiment of the invention wherein the compactor mechanism, specifically the ram 17 and the centrifuge blades 44, are operated and controlled by an electro-hydraulic system. As FIGS. 7 and 8 show, the ram 17 is reciprocably movable by means of a hydraulic cylinder 60 which includes a housing 61 and a piston 62 which is connected by a piston rod 63 to ram 17. Cylinder housing 61 includes fluid ports 64 and 65 which are connected by fluid lines 66 and 67, respectively, to a hydraulic pump 70 which is understood to include such necessary components (not shown) as the reservoir, safety valves, etc. Pump 70 also includes a direct-acting solenoid operated three-position, four-way directional control valve 71 with an open center 71 which is shown in cross section in FIG. 13.

As FIGS. 7 and 8 show, centrifuge blade 44 is mounted for rotation on the lower end of a sleeve 72 which surrounds piston rod 63. Blade 44 is provided with a pulley 73 which is connected by a belt 74 to another pulley 75 which is driven by an electric motor 76. It is to be understood that the blades 44 could be driven in some manner other than shown. As FIG. 8 shows, limit switches 77 and 78 are provided and respond to the position of the piston 62 and its associated ram 17. Upward and downward movement of the piston 62 and ram 17 effects operation of the limit switches 77 and 78. As hereinafter explained in connection with the circuit diagram shown in FIG. 12, these switches effect alternating operation of the solenoids 79 and 80 on the control valve 71 shown in FIG. 13. Valve 71 includes a spool 81 which moves reciprocably to direct fluid in alternating and opposite directions through the supply lines 66 and 67 to cause reciprocating movement of ram 17 as hereinafter explained in detail.

Figures 9, 10:
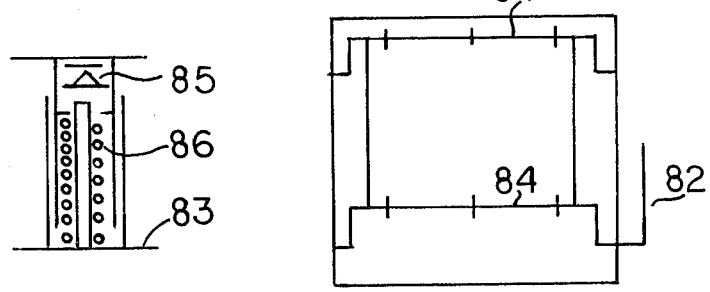
FIG. 9 is an enlarged schematic view of an electrical contact used in the mechanism of FIG. 7.
FIG. 10 is a top plan schematic view of a portion of the mechanism shown in FIG. 7.

As FIG. 7 shows, the apparatus is provided with a handle 82 which is used to move the lower portion or floor 83 of the apparatus downwardly so as to permit removal of the filled bag 34 so that a new bag may be inserted. As previously noted, the bags should be made of strong material that can withstand considerable weight and compacting pressure. As handle 82 is moved downward it causes rotation of the rods 84 connected thereto and lowering movement of the floor 83. As FIGS. 7 and 9 show, electrical contacts 85 are associated with floor 83 and, in the event that downward compacting pressure of ram 17 exceeds a certain level, the contacts 85 are closed as floor 83 moves downwardly and such switch closure causes de-energization of the electric motors driving the system. Pressure responsiveness of the system is determined by the forces required to compress spring 86. Operation of any contact 85 also causes an alarm such as a bell or light 87 to go on and warn the machine operator.

Figure 11:
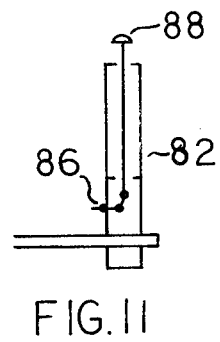
FIG. 11 is a schematic view of the handle-operating mechanism of FIG. 10.

FIG. 11 shows an enlarged view of handle 82 which is associated with a pushbutton 88 on its top. When pushbutton 88 is depressed, the latch 86 retracts and allows the handle 82 to be moved downward. This prevents accidental movement of the bag and its container in a downward direction during compaction. When handle 82 is moved downward intentionally, the mechanism associated therewith enable the floor 83 to be moved from the raised position to the lowered position.

Figure 12:
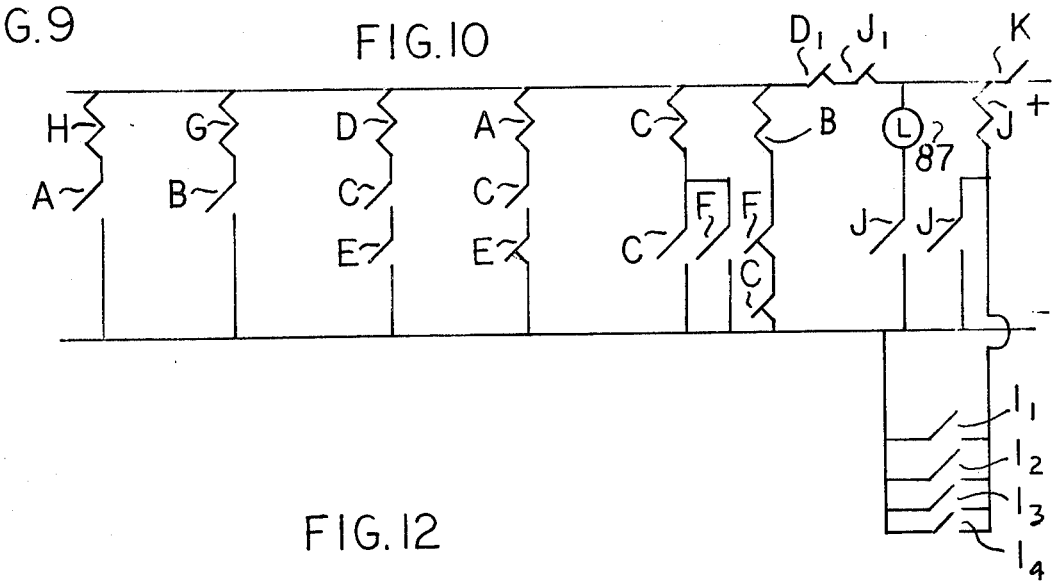
FIG. 12 is a circuit diagram of an electric control system for the mechanism of FIG. 7.

Referring now to FIG. 12, the operation of the electrical control system will be described. When the operator feels the bag is sufficiently filled to require compaction, he closes switch K to effect energization of relay coil B. This effects energization of solenoid G of the directional valve 71 and piston 62 and ram 17 to move downward. When piston 62 reaches lower limit switch 78, it causes relay coil B to be de-energized and this causes de-energization of solenoid G. At this time the contact F for relay coil C will close and will cause this relay to remain closed. This will result in energization of relay coil A which energizes solenoid H and this will reverse the direction of flow of hydraulic fluid and move piston 62 and ram 17 upward until the limit switch E is reached and closed. Closure of limit switch E will result in de-energization of relay coil A and de-energization of solenoid H. A time-delay relay D has been provided so as to prevent downward descent of ram 17 for some predetermined period of time to prevent undue cycling of ram 17. As FIG. 12 shows the circuit diagram also includes the contacts 85 hereinbefore described. Closure of any one of these contacts will effect closure of relay J and this will result in energization of the alarm light (or bell) 87 and will also result in shutting off the entire system by opening contact J₁. When the operator opens switch K, the relay J re-opens and the light 87 is de-energized.

Limit switches E and F can be placed in other locations for example to open and close with movement of ram 17, rather than with piston 62.

Also, the same mechanism as described related to contacts 85 apply to the electrical system of FIG. 6 to shut off the compressing action when further compressing is not safe for the integrity of the equipment.

The electrical control circuit shown in FIGS. 9 and 12 for warning the operator of the equipment that the compacting is done to its maximum limit and to shut the circuit off automatically is also applicable to the embodiment of FIGS. 5 and 6. Also appliable to the embodiment of FIG. 1 is the relay J which turns off, for example, an electrical clutch and stops the ram or signals by ringing a bell or flashing a light to inform the operator to stop the compacting mechanism.

It is to be understood that the various component parts comprises in the present invention could be located and positioned on the chassis other than shown in the drawings. If desired, a shredder could be added to the apparatus ahead of the compacting mechanism. Also, suitable clutch mechanisms can be provided, such as idler pulleys, to engage and disengage various driven components in the system to allow operation of some, all or none of the components while the prime mower is operating. Further, other systems than shown could be employed to drive the centrifuge blade.

The apparatus can be built just for vacuuming and compacting leaves and debris without having a mower, or can be attached to the back of a tractor or riding lawnmower to be driven by a tractor engine or can be attached in the back of a tractor on wheels like a trailer. In any case, the inlet of the vacuum can be connected to the outlet of the mower or used separately. The tractor can be a means for moving the vacuum compactor behind it with a nozzle for the vacuum, as is shown in FIG. 1A, to vacuum leaves.

I claim:

1. Vacuuming and compacting apparatus for material such as leaves and grass clippings comprising:
    a support;
    a prime mover on said support;
    a vacuum pump on said support and drivable by said prime mover, said vacuum pump having an inlet port for ingesting material and an outlet port for expelling material;
    a receptacle on said support and having an inlet port connected to the outlet port of said vacuum pump;
    and a compactor on said support and drivable by said prime mover, said compactor including a reciprocably movable ram for entering said receptacle and compacting the material therein, said ram moves to a position below said inlet port of said receptacle and further including a centrifuge for blowing material deposited on said ram therepast and into said receptacle.

2. In a combined power lawnmower and vacuuming and compacting apparatus for material such as leaves and grass clippings, in combination:
    a chassis having ground-engaging wheels and a push-handle;
    a material-receiving housing on said chassis, said housing having an outlet opening;
    a rotatable mower blade mounted in said housing;
    a vacuum pump mounted on said chassis and having an inlet port and an outlet port;
    a rotatable fan blade in said pump;
    first conduit means connecting said outlet opening of said housing to said inlet port of said pump;
    a material-receiving receptacle on said chassis, said receptacle having an inlet opening;
    second conduit means connecting said outlet port of said pump to said inlet opening of said receptacle;
    a compactor on said chassis and including a ram reciprocably movable into said receptacle past said inlet opening of said receptacle, said compactor further including a centrifuge for blowing material deposited on said ram into said receptacle;
    and means on said chassis for driving said mower blade, said fan blade, said ram and said centrifuge.

3. Apparatus according to claim 2 wherein said first conduit means is flexible and is detachably connected to said outlet opening of said housing.

4. Apparatus according to claim 2 or 3 wherein said means for driving said mower blade, said fan blade and said ram is a prime mover.

5. Apparatus according to claim 4 wherein said prime mover is an internal combustion engine.

6. Apparatus according to claim 4 wherein said prime mover is an electric motor.

7. Apparatus according to claim 5 wherein means for driving said centrifuge is an electric motor.

8. Apparatus according to claim 5 wherein said means for driving said centrifuge is a power transmission system connected to the prime mover.

9. Apparatus according to claim 4 further including a hydraulic system driven by said prime mover to operate said ram.

10. Apparatus according to claim 2 wherein said driving means includes a separate electric motor for driving said ram.

11. In vacuuming and compacting apparatus for material such as leaves and grass clippings, in combination:
   a chassis having ground-engaging wheels;
   a material-receiving housing on said chassis, said housing having an outlet opening;
   a vacuum pump mounted on said chassis and having an inlet port and an outlet port;
   a rotatable fan blade in said pump;
   first conduit means connecting said outlet opening of said housing to said inlet port of said pump;
   a material-receiving removable receptacle on said chassis, said receptacle having an inlet opening;
   second conduit means connecting said outlet port of said pump to said inlet opening of said receptacle;
   a compactor on said chassis and including a ram reciprocably movable into said receptacle past said inlet opening of said receptacle, said compactor further including a centrifuge for blowing material deposited on said ram into said receptacle;
   and means on said chassis for driving said fan blade, said ram and said centrifuge.

12. Apparatus according to claim 11 wherein said chassis includes a vertically movable platform on which said removable receptacle is mounted, and means for lowering said platform to enable removal of said receptacle.

13. Apparatus according to claim 11 including control means to stop reciprocating movement of said ram when said receptacle is filled to a predetermined height.

14. Apparatus according to claim 13 wherein said control means includes limit switches.

15. Apparatus according to claim 11 wherein chassis is part of a tractor.

16. Apparatus according to claim 11 wherein chassis is part of a trailer adapted to be towed by another vehicle.

* * * * *